Oct. 11, 1932.  A. H. OELKERS  1,882,231
ROLLER BEARING ASSEMBLY
Filed Feb. 11, 1929
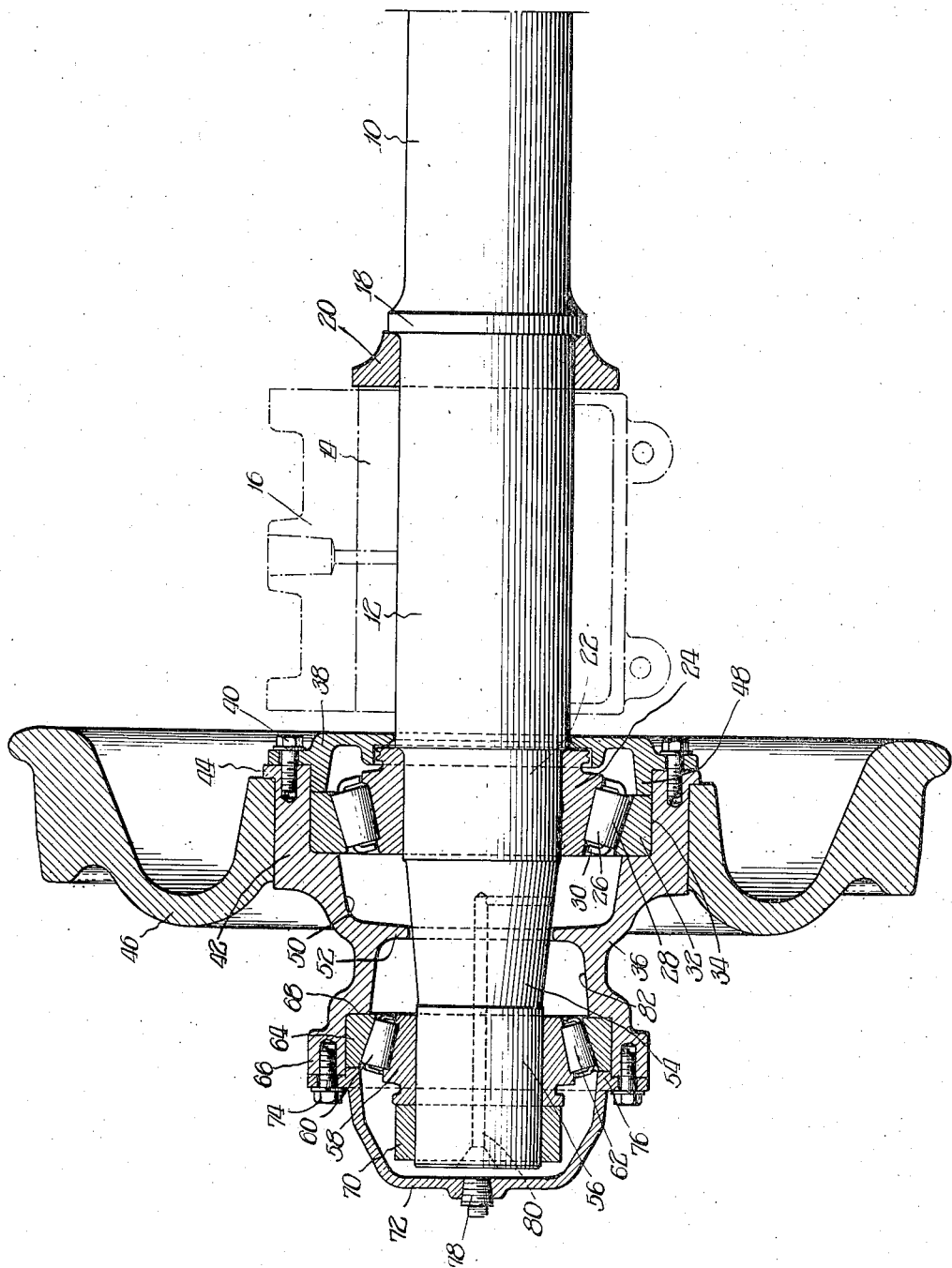
Inventor-
Alfred H Oelkers
By Wilkinson, Huxley, Byron & Knight
attys.

Patented Oct. 11, 1932

1,882,231

UNITED STATES PATENT OFFICE

ALFRED H. OELKERS, OF CHICAGO, ILLINOIS, ASSIGNOR TO AMERICAN STEEL FOUNDRIES, OF CHICAGO, ILLINOIS, A CORPORATION OF NEW JERSEY

ROLLER BEARING ASSEMBLY

Application filed February 11, 1929. Serial No. 338,930.

This invention pertains to wheel and axle assemblies, and more specifically to anti-friction wheel and axle assemblies for use on locomotive front engine trucks.

An object of this invention is to provide a wheel and axle assembly which can be installed in existing engine trucks of locomotives without alterations in the truck, and one which permits each wheel of the truck to revolve independently of the others, and though providing roller bearings for each wheel, yet permits each axle to revolve on the conventional type of journal bearings in case of failure of any or all of the roller bearings.

Another object is to provide an anti-friction wheel and axle assembly having journal portions which permit the weight to be carried on journal bearing surfaces, the assembly being arranged with respect to the journal boxes wherein it is possible for the axle to shift laterally within the truck assembly independently of the function of the roller bearings.

A further object is to provide an anti-friction wheel and axle assembly wherein the roller bearings on each end of the axle are adjusted to proper running clearances by movement of one of the bearing cones and whereby simple locking means may be provided for locking the cones and thereby the complete assembly in its operative position.

A still further object is to provide a separate wheel and axle assembly for each wheel of a locomotive truck and one in which wheels may be assembled or disassembled from the remainder of the assembly without dismantling any other part of said assembly.

With these and various other objects in view, the invention may consist of certain novel features of construction and operation, as will be more fully described and particularly pointed out in the specification, drawing and claims appended hereto.

The figure is a fragmentary sectional elevation through one end of a wheel and axle assembly embodying the invention.

As it will be understood that the present invention is applicable to locomotive trucks or the like of any character or any number of wheels, it is thought that it will be only necessary to describe one unit of the wheel and axle assembly as associated with a truck axle and one of its journal boxes.

Truck axle 10 is provided with a journal portion 12 on which the weight of the truck is carried by journal bearing 14, mounted within the truck journal box or journal 16. The axle is provided with an enlarged collar portion 18 against which thrust collar 20 is seated; the thrust collar, journal box and enlarged portion of the axle being so proportioned that there is provided a limited amount of clearance, as illustrated, which permits the axle 10 to shift laterally within the journal box 16 to the extent of the clearance permitted between the thrust collar 20 and the journal box.

The axle 10 is provided with a reduced portion 22 adjacent the bearing portion 12, said portion being adapted to receive the bearing cone 24 of the anti-friction bearing assembly 26. The anti-friction bearing assembly is provided with anti-friction rollers 28, shown disposed in cages 30, and cooperating with the outer racering or bearing cup 32 mounted as by a pressed fit in a bearing receiving portion 34 of the housing 36. The housing 36 is provided with a cap 38 secured as by the bolts 40 to a portion of the housing 42, said portion being provided with a shoulder 44 adapted to limitingly position the wheel 46 disposed on the elongated portion 42 as by a pressed fit. The cap 38 is provided with inwardly extending portion 48 adapted to abut the bearing cup 32 to maintain the same in its operative position, the cap 38 extending inwardly to a point adjacent a portion of the bearing 12 of the axle 10 to thereby close the lubricant recess 50 provided in the housing by the inwardly extending portion 52 of the housing, said portion being proportioned for the reception of the tapered portion 54 of the axle connecting the bearing cone receiving portions 22 and 56 of said axle. The bearing receiving portion 56 is preferably of smaller diameter than the bearing receiving portion 22 and receives the bearing cone 58 of an anti-friction assembly 60. Said assembly is provided with rollers 62 in bearing cup 64 press fitted into the cup receiving portion 66 of the housing, a portion 68 forming a stop for said cup.

The bearing cone is secured in its operative position by means of the collar 70 shrunk on the cone receiving portion 56 after the assembly is completed. A cover plate 72 is secured as by bolts 74 to the portion 66 of the housing, said cap being provided with shouldered portions 76 adapted to abut the bearing cup to maintain the same in operative position. The cap may also be provided with a lubricant plug 78 removable and disposed in way of the lubricant receiving passage 80 disposed in the axle 10 and extending into said axle to communicate with the lubricant recess 50, the plug 78 also serving as a means for supplying the lubricant recess 82 provided in the housing for the outer bearing assemblies.

It will be seen that the portion 42 of the housing is of such proportions that the wheel 46 may be disassembled or assembled with respect to the housing without disturbing or interfering with any parts of the roller bearing assembly, and for this reason the axle complete with the roller bearings and their housing forms a completely assembled unit which can be installed on engine trucks of locomotives so that rotation may take place either on the roller bearing assemblies, or in case of failure, on the journal bearings 14. The assembly also permits separate rotation of the wheels of the truck and because of its accessibility and ease of assembly, permits replacement of the parts with comparative ease.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a wheel and axle assembly, the combination of a relatively fixed axle having bearing portions adapted to have cooperative relation with journal bearings, thrust collars mounted on said axle spaced from said journal box bearings to provide clearance whereby said axle may shift laterally, housings mounted on said axle outside of said journal boxes, said housings each having an inwardly extending apertured wall forming lubricant recesses in said housings, said axle extending thru said apertured walls and being provided with a lubricant channel communicating with one of said recesses for filling said recess from the end of said axle, said recesses having oppositely faced race ring receiving portions, cover plates for said housings, race rings disposed on said fixed axle substantially in the planes of said first named race rings and anti-friction rollers disposed between and cooperating with said race rings, and a wheel receiving portion disposed on said housings of a size whereby said wheels may be assembled or disassembled with respect to said housings without disturbing the housings and associated parts.

2. In a wheel and axle assembly, the combination of a relatively fixed axle having operating portions adapted to have cooperative relation with journal box bearings, housings mounted on said axle outside of said journal boxes, said housings each having an inwardly extended apertured wall forming lubricant recesses in said housings, said axle extending through said apertured walls and being provided with a lubricant channel communicating with one of said recesses for filling said recess from the end of said axle, said recesses being provided with anti-friction bearings disposed between said axle and said housing, and a wheel receiving portion disposed on said housings of a size whereby said wheels may be assembled or disassembled with respect to said housings without disturbing the housings or associated parts.

3. In a wheel and axle assembly, the combination of a relatively fixed axle having operating portions adapted to have cooperative relation with journal box bearings, housings mounted on said axle outside of said journal boxes, said housings each having an inwardly extended apertured wall forming lubricant recesses in said housings, said axle extending through said apertured walls and being provided with a lubricant channel communicating with one of said recesses for filling said recess from the end of said axle, said recesses having oppositely faced racering receiving portions, cover plates for said housings, racerings disposed on said fixed axle substantially in the planes of said first named racerings, anti-friction rollers disposed between and cooperating with said racerings, and a wheel receiving portion disposed on said housings of a size whereby said wheels may be assembled or disassembled with respect to said housings without disturbing the housings or associated parts.

4. In a wheel and axle assembly, the combination of a relatively fixed axle supported in bearings, separate housings disposed on said axle, a wheel mounted on each of said housings, and spaced anti-friction bearings mounted between each of said housings and the axle and disposed in separate lubricant recesses provided in each of said housings.

5. In a wheel and axle assembly, the combination of an axle supported in bearings, housings disposed on said axle outside said bearings, a wheel mounted directly on and contacting each of said housings, and spaced anti-friction bearing assemblies mounted between each of said housings and the axle.

6. In a wheel and axle assembly, the combination of an axle supported in bearings, housings disposed on said axle outside said bearings, said housings including an anti-friction bearing receiving portion, a spaced anti-friction bearing portion, anti-friction bearings disposed in said portion between said housings and said axle, a wheel receiving portion on said housings, and a cover plate secured to each housing and removable without disturbing any other part of the assembly.

7. In a wheel and axle assembly, the combination of an axle supported in bearings, housings disposed on said axle outside said bearings, said housings including oppositely faced anti-friction bearing receiving portions, anti-friction bearings disposed in said portions and mounted between said housings and said axle, retaining members cooperating with said anti-friction bearing assemblies for maintaining the same in operative position, and an enlarged wheel receiving portion provided on said housing of a size whereby said wheel may be assembled and disassembled with respect to said housing without interfering with any part of the assembly.

8. In an anti-friction bearing assembly, the combination of a relatively fixed member, a housing disposed adjacent thereto, anti-friction bearings disposed between said housing and said fixed member, a cover plate for the end of said housing enclosing said fixed member, a hub portion on said housing and a member disposed on said housing removed from said hub portion and forming a lubricant recess with said cover plate and housing for said anti-friction bearings.

9. In an anti-friction bearing assembly, the combination of a relatively fixed member, a housing disposed adjacent thereto, anti-friction bearings disposed between said housing and said fixed member, a cover plate for the end of said housing enclosing said fixed member, a hub portion on said housing, a member disposed on said housing removed from said hub portion and forming a lubricant recess with said cover plate and housing for said anti-friction bearings, and anti-friction bearings disposed between said housing and said fixed member and substantially in the plane of said hub portion.

10. In an anti-friction bearing assembly, the combination of a relatively fixed member, a housing disposed adjacent thereto, anti-friction bearings disposed between said housing and said fixed member, a cover plate for the end of said housing enclosing said fixed member, a hub portion on said housing, a member disposed on said housing removed from said hub portion and forming a lubricant recess with said cover plate and housing for said anti-friction bearings, anti-friction bearings disposed between said housing and said fixed member and substantially in the plane of said hub portion, and a cover plate secured to said housing for defining another lubricant recess for said second named anti-friction bearings.

11. In an anti-friction bearing assembly, the combination of a floating axle, said axle having bearing portions of different diameters, a housing disposed adjacent said bearings portions and having cover plates closing the opening between said housing and axle, anti-friction bearings mounted between said housing and the bearing portion of larger diameter, a wheel mounted on said housing substantially in the plane of said bearings, and anti-friction bearings mounted between said casing and said bearing portion of smaller diameter, said last named bearings being in a plane spaced from said wheel.

12. A wheel and axle assembly, comprising a supported axle, an anti-friction assembly mounted for rotation on said axle, said assembly including a housing for containing a lubricant for said assembly, said housing having an enlarged inner wheel receiving portion, and an outer portion, anti-friction means in said portions for rotatively supporting said housing on said axle, and a wheel having a hub for clearance of said outer portion and removably fitting said enlarged portion.

13. A wheel and axle assembly, comprising a supported axle, an anti-friction assembly mounted for rotation on said axle, said assembly including a housing for containing a lubricant for said assembly, said housing having an enlarged inner wheel receiving portion, and an outer portion, anti-friction means in said portions for rotatively supporting said housing on said axle, and a wheel removably mounted on said enlarged portion about the inner of said anti-friction means.

14. A wheel and axle assembly, comprising a supported axle, an anti-friction assembly mounted for rotation on said axle, said assembly including a housing for containing a lubricant for said assembly, said housing having an inner and an outer portion for reception of anti-friction means rotatively supporting said housing, said housing having a wheel receiving portion spaced from the outer of said portions, and a wheel removably secured to said wheel receiving portion and having clearance with said outer portion during assembly and disassembly of the same.

15. A wheel and axle assembly, comprising a supported axle, an anti-friction assembly mounted for rotation on said axle, said assembly including a housing having a plurality of lubricant chambers, anti-friction means in said chambers for rotatively supporting said housing, means associated with said axle for communication between said chambers, and a wheel secured to said housing.

16. A wheel and axle assembly, comprising a supported axle, an anti-friction assembly mounted for rotation on said axle, said assembly including a housing having a plurality of lubricant chambers, anti-friction means in said chambers for rotatively supporting said housing, a duct in said axle communicating with said chambers, and a wheel secured to said housing.

17. A wheel and axle assembly, comprising a supported axle, an anti-friction assembly mounted for rotation on said axle, said assembly including a housing having a plurality of lubricant chambers, anti-friction means in said chambers for rotatively supporting said housing, means associated with one of said chambers for introduction of a lubricant therein, means accessible thereto for passage of a lubricant to the other of said chambers, and a wheel secured to said housing.

18. A wheel and axle assembly, comprising a supported axle, an anti-friction assembly mounted for rotation on said axle, said assembly including a housing having a plurality of lubricant chambers, anti-friction means in said chambers for rotatively supporting said housing, means associated with one of said chambers for introduction of a lubricant therein, a duct in said axle accessible thereto and communicating with the other of said chambers for passage of a lubricant therethrough, and a wheel secured to said housing.

19. A wheel and axle assembly, comprising a supported axle, an anti-friction assembly mounted for rotation on said axle, said assembly including a housing having a plurality of recessed portions having their walls spaced at varying distances radially from the axis of said axle, anti-friction means in said recessed portions for rotatively supporting said housing, means for supplying a lubricant to said recessed portions and anti-friction means, means for maintaining the lubricant level in each of said recessed portions, and a wheel secured to said housing.

20. A wheel and axle assembly, comprising a supported axle, an anti-friction assembly mounted for rotation on said axle, said assembly including a housing having a plurality of recessed portions having their walls spaced at varying distances radially from the axis of said axle, anti-friction means in said recessed portions for rotatively supporting said housing, means for supplying a lubricant to said recessed portions and anti-friction means, means for maintaining the lubricant level in each of said recessed portions, said means comprising projecting elements extending inwardly from said housing providing separate chambers for each of said anti-friction means, and a wheel secured to said housing.

21. In a wheel and axle assembly, the combination of a relatively fixed axle, bearings for mounting said axle, separate housings mounted outwardly of and terminating adjacent said bearings, a wheel mounted on each of said housings, and spaced anti-friction bearings mounted between said housings and said axle and disposed in lubricant recesses formed in said housings.

Signed at Chicago, Illinois, this 7th day of February, 1928.

ALFRED H. OELKERS.